M. J. MURPHY & H. H. BRANDEAU.
MILKING MACHINE.
APPLICATION FILED MAR. 7, 1916.
1,218,446.
Patented Mar. 6, 1917.
2 SHEETS—SHEET 2.
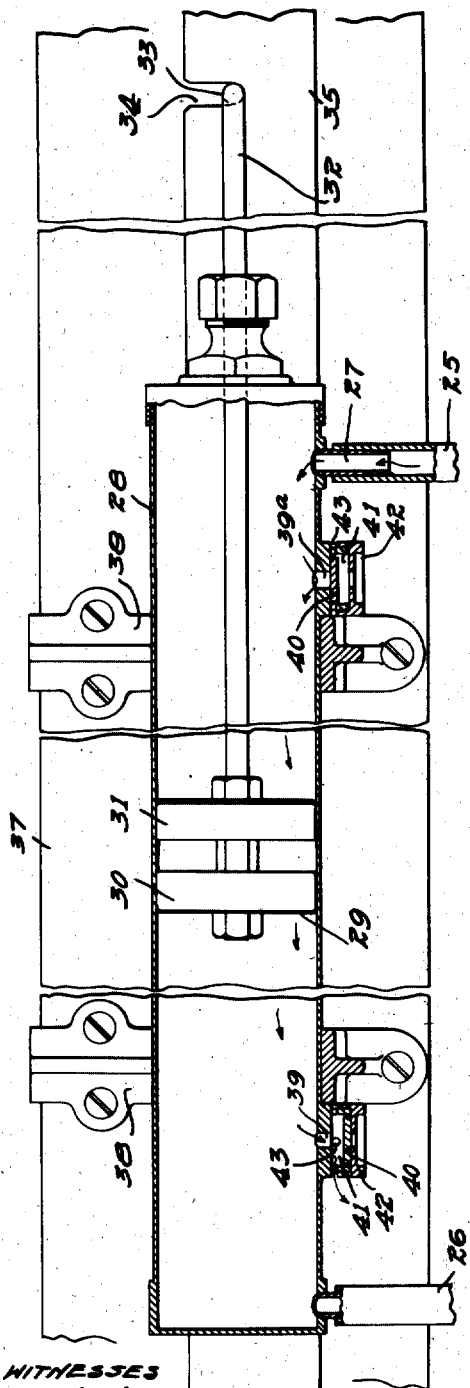
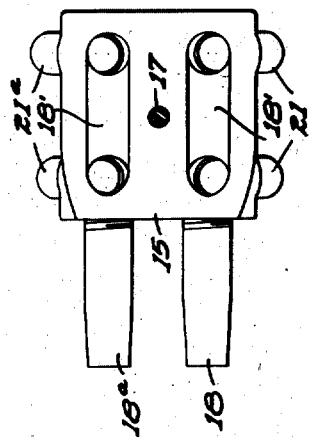
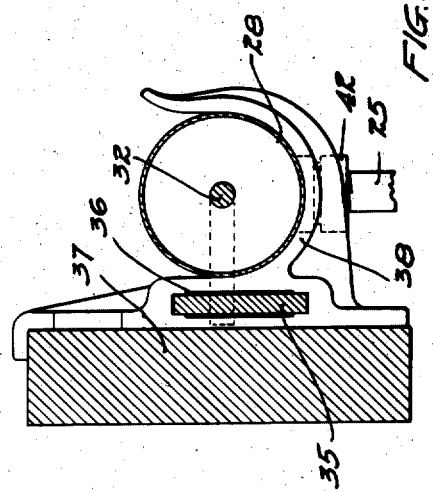
WITNESSES
M.R.M...
E. A. Paul
INVENTORS
MARK J. MURPHY
HARRY H. BRANDEAU
BY Paul & Paul
ATTORNEYS

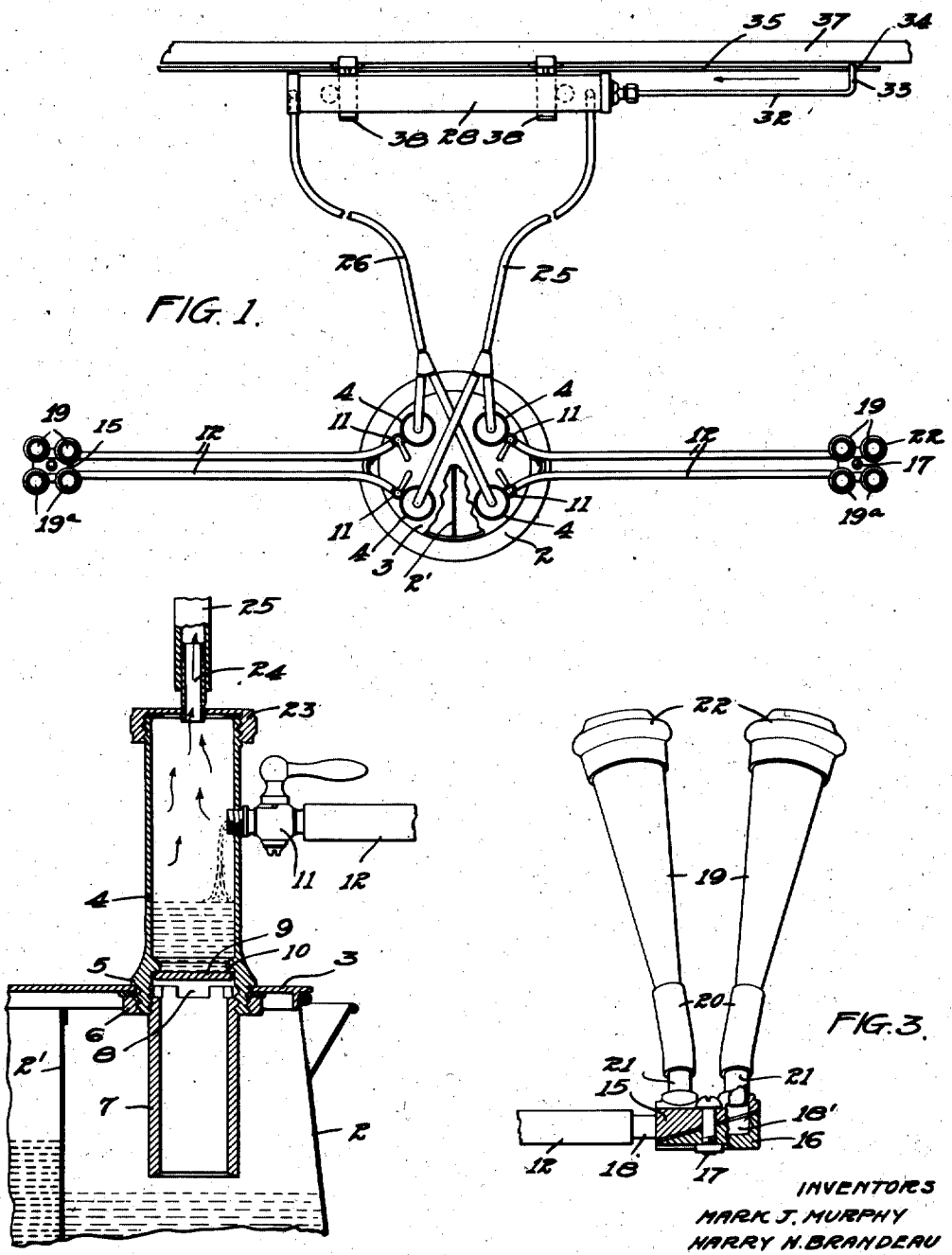

UNITED STATES PATENT OFFICE.

MARK J. MURPHY AND HARRY H. BRANDEAU, OF ST. PAUL, MINNESOTA.

MILKING-MACHINE.

1,218,446.   Specification of Letters Patent.   Patented Mar. 6, 1917.

Application filed March 7, 1916. Serial No. 82,535.

*To all whom it may concern:*

Be it known that we, MARK J. MURPHY, citizen of the Dominion of Canada, and HARRY H. BRANDEAU, citizen of the United States, residents of St. Paul, county of Ramsey, State of Minnesota, have invented certain new and useful Improvements in Milking-Machines, of which the following is a specification.

The object of our invention is to provide a milking machine having improved means for controlling the discharge of the milk from the receivers into the milk receptacle, said controlling means being mounted in such a way that it is readily removable for cleansing purposes or for repairs.

A further object is to provide milk receivers and teat cups of such construction that all parts thereof exposed to contact with the milk are readily accessible, have no spaces in which foreign matter may lodge and taint the milk, and can be easily and quickly scalded whenever desired.

A further object is to provide an improved form of pump composed of but few parts and easily movable from place to place on the operating bar or rod.

The invention consists generally in various constructions and combinations, all as hereinafter described and particularly pointed out in the claims.

In the accompanying drawings forming part of this specification,

Figure 1 is a plan view of a milking machine embodying our invention,

Fig. 2 is a detail sectional view through a portion of the milk receptacle and one of the milk receivers.

Fig. 3 is a detail view, partially in section, of the head in which the teat cups are mounted, Fig. 4 is a longitudinal sectional view of a single cylinder, double-acting pump which we prefer to use with our milking machine, Fig. 5 is a sectional view, illustrating the preferred manner of supporting the pump cylinder, Fig. 6 is a detail view of one portion of the head in which the teat cups are mounted.

In the drawing, 2 represents a milk receptacle of suitable size and shape, having an open top in which a flanged disk 3 is seated. The receptacle is preferably provided with a vertical partition 2' to allow the user to keep the milk of the two cows separate during the milking operation. The disk 3 is provided with holes, preferably four in number, to receive the lower threaded end of a tubular milk receiver 4 having a flange 5 that is seated on the top of the disk 3 and a nut 6 for engaging the threaded end of the receiver and locking it securely in the hole in the disk. The lower end of the receiver is interiorly threaded to receive the exteriorly threaded end of a tubular extension 7 of the receiver that is provided with a series of notches 8 and forms a seat for a valve disk 9 that is fitted loosely between the upper end of the extension 7 and a rib 10 that is formed on the inner surface of the receiver. This disk is sufficiently loose to allow the milk to flow between the edge of the disk and the wall of the receiver and enter the recesses 8 and pass down through the extension 7 into the milk receptacle beneath. The receiver can be readily removed from the disk 3 by loosening the nut 6 and whenever desired, the extension 7 may be withdrawn from its threaded socket in the receiver to allow access to the valve disk for the purpose of cleansing and renewing the same or for scalding the interior of the receiver itself.

A valve 11 is mounted in the side wall of the receiver and a flexible tube 12 connects this valve with a teat cup head in which the teat cups are mounted. This head consists preferably of sections 15 and 16 having opposing inclined faces seated against one another and secured together by a bolt 17. The section 15 has nipples 18 and 18ª for connection of the tubes 12 thereto and teat cups 19 and 19ª, four in number, have flexible couplings 20 with the nipples 21 and 21ª of the section 15. The cups are preferably of metal and have the usual flexible caps 22 for receiving the teats.

As shown in Fig. 6, the nipple 18 is connected with the nipples 21 while the nipple 18ª is connected with the nipples 21ª, a passage 18' being provided between the nipples in the head of the same pair; that is, the suction through the nipple 18 will be transmitted to both the nipples 21 and through the nipple 18ª to both the nipples 21ª. As here shown, there are four of the milk receivers mounted on the supporting disk 3 and two groups of teat cups, 4 in each group, each divided into two pairs, two of the teat cups of one group being connected with one receiver and the other two teat cups of the same group being connected with the adjacent receiver. With this provision, two cows can be milked at the same time and the milk kept separate in the receptacle 2. The top of each receiver has a removable cap 23 provided with a nipple 24 for connection with the air suction tubes 25 and 26. These tubes are branched at one end and connected with the nipples of the diagonally opposite milk receivers so that suction will be applied to these receivers simultaneously and the connection of these receivers with the teat cups is such that suction will be applied to one pair of the cups of one group and another pair of the other group of cups simultaneously. In other words, the movement of the pump plunger in one direction will create a suction in two of the cups of each group and release the suction in the other two cups of the same group. Therefore, while the pump plunger is closing the valve at one end of the cylinder and establishing a suction in the teat cups connected with that end of the cylinder, the air is being forced out of the opposite end of the cylinder and the suction in the cups connected with that end released or destroyed to allow the valve in the milk receivers connected with that end to open and the milk flow down into the receptacle beneath. When the members of the teat cup heads are separated, the passages 18' and the nipples will all be exposed and can be easily scalded and all dried milk and foreign matter which may have lodged in the crevices or joints of the cups and passages can be easily and quickly removed. This feature of accessibility of the parts of the milking machine and the ease with which all such parts can be exposed and kept clean, we regard as an important feature in the construction of our device.

The other ends of the suction tubes 25 and 26 are connected to nipples 27 of the single cylinder 28 of a double-acting pump. This pump has a single piston 29 provided with oppositely arranged washers 30 and 31. A single rod 32 is connected to the piston and is provided with an angular extension 33 adapted to enter a slot 34 in a reciprocating bar 35 operated by a suitable source of power and movable in guides 36 carried by a suitable support 37. Brackets 38 are mounted on said guides and have substantially U-shaped seats wherein said cylinder is fitted. Ports 39 and 39ª are provided near the opposite ends of the cylinder and valve disks 40 are mounted in suitable cups 41 having caps 42 which permit a limited movement of the disks to open or close the ports 39 and 39ª. Exhaust passages 43 are provided in the walls of said cups through which the air is allowed to escape when a valve is opened.

The operation of the device is as follows: The pump, having been placed on the brackets, with the piston rod in engagement with the normally reciprocating bar 35, operated by a suitable source of power (not shown), the piston head will be reciprocated in the cylinder and through its movement in one direction will close the valve in one end of the cylinder and create a suction in the milk receivers connected with that end of the cylinder. This suction will close the valve in the bottom of the milk receiver and produce a milking action of the cups in the well-known way.

Assuming that the movement of the piston has been from left to right in Fig. 4, the port 39 will be closed and a suction created in the tube 26. The air in the right hand end of the cylinder will be forced out through the port 39ª and the exhaust ports in the valve beneath, and the suction in the tube 25 will be destroyed to release the gravity valves in the receivers connected with the tube 25 to allow them to drop and permit the escape of the milk that may have collected in the receivers. Upon the return stroke of the plunger the operation described will be repeated, with respect to the other two milk receivers connected with the tube 26.

We claim as our invention:

1. A milking machine comprising a milk receptacle having separate compartments for the milk, milk receivers mounted on said receptacle for each compartment, teat cups arranged in groups, each milk receiver having a tube for connection with a pair of cups, the receivers communicating with the same compartment of the milk receptacle being connected with the pairs of cups of the same group, and a pump having suction tubes for connection with pairs of milk receivers.

2. In a milking machine, a milk receiver having means for mounting it upon a milk receptacle and provided with an open lower end for the discharge of the milk and also having a stop on its inner walls and a floating valve provided within the open lower end of said receiver and encircled by the walls thereof and positioned to engage said stop and close said receiver temporarily during the entrance of the milk therein.

3. A milking machine comprising a milk receptacle having separate compartments for the milk, milk receivers mounted on said receptacle for each compartment, teat cups arranged in groups, each milk receiver having a tube for connection with a pair of cups, the receivers communicating with the same compartment of the milk receptacle being connected with the pairs of cups of the same group, and a pump having suction tubes for connection with pairs of milk receivers, one receiver of each pair communicating with one compartment of said receptacle and the other receiver of the same pair with the other compartment of said receptacle.

4. In a milking machine, a milk receiver having means for mounting it on a milk receptacle and provided with a milk discharge opening and a valve seat, an extension for said milk receiver fitting therein and having notches in its upper end, a valve disk fitting loosely between said valve seat and the end of said extension, said valve at the limit of its upward movement closing said milk discharge opening and when released resting upon said extension and permitting the discharge of milk through said notches.

5. A milking machine comprising a milk receptacle and a plurality of milk receivers mounted thereon, teat cups having means for connection with said receivers, suction tubes connected with said receivers, a single cylinder pump having its ends connected with said suction tubes and provided with a double disk piston with reversely arranged packings thereon, the movement of said piston forcing the air through one suction tube into one pair of milk receivers and simultaneously exhausting the air from the other suction tube and the other pair of milk receivers.

6. In a milking machine, a milk receiver having means for mounting it on a milk receptacle and provided with a milk discharge opening in its lower end and a valve seat on the walls of said receiver above said opening, an extension for said milk receiver fitting the open lower end thereof and depending into the milk receptacle, the upper end of said extension being spaced from said valve seat, a valve disk fitting between said extension and said seat and having freedom of vertical movement for closing or opening the discharge opening of said receiver, and said extension having ports adjacent said valve for the discharge of the milk when said valve is released from its seat.

7. In a milking machine, a suitable receptacle, a cover therefor, a plurality of milk receivers mounted in an upright position on said cover and projecting above the same, each milk receiver being mounted independently of the other milk receivers and detachable separately from said cover, each receiver having a milk discharge opening at its lower end, a valve and seat therefor in each receiver for controlling the discharge of milk from such receiver, and a pump and teat cups connected with said receivers.

8. In a milking machine, a milk receptacle and cover therefor, a plurality of milk receivers having their lower ends tapped into said cover and provided with lock nuts for securing said lower ends in said cover, said receivers being readily removable from said cover and having milk discharge passages leading to said receptacle, and valves therefor, and a pump and teat cups connected with said receivers.

9. In a milking machine, a teat cup head divided into independent sections having opposing recesses therein forming passages when the sections are joined, and means for securing them together, teat cups mounted in pairs on said sections, one pair communicating with one passage and the other pair with the other passage, and said head having means for connection with the suction tubes.

10. In a milking machine, a teat cup head divided diagonally into independent sections, said sections having opposing recesses therein, forming passages when the sections are joined, and a bolt passing through said sections and securing them one upon the other, teat cups mounted in pairs on said sections, one pair communicating with one passage and the other pair with the other passage, and said head having means for connection with suction tubes.

11. A milking machine comprising a milk receptacle and a group of four milk receivers mounted thereon, teat cups having means for connection with said receivers, a pump cylinder, suction tubes connecting the ends of said cylinder with pairs of milk receivers respectively, and a piston operating in said cylinder between said suction tubes, the movement of said piston in one direction forcing the air in one end of the cylinder out through a suction tube into one pair of milk receivers and the movement of the piston in the other direction creating a suction in said pair of milk receivers and forcing the air in the other end of the cylinder through the other suction tube into the other pair of milk receivers.

12. A milking machine comprising a milk receptacle and a plurality of milk receivers mounted thereon, said receivers each having a valve seat and a floating valve mounted to close the outlet of said receiver when suction is applied thereto and open said outlet when the suction is withdrawn, a pump cylinder, suction tubes connecting the ends of said cylinder with the pairs of milk receivers respectively, a piston operating in said cylinder, its movement in one direction forcing the air out of the cylinder through one of said suction tubes to open the valves in one pair of milk receivers and simultaneously close the valves and suck the air through said tube from the other pair of milk receivers.

13. A milking machine comprising a milk receptacle, two pairs of milk receivers mounted thereon, a single cylinder pump, suction tubes leading from the ends of said cylinder and connected respectively to pairs of milk receivers alternately arranged, groups of teat cups each composed of two pairs, suction tubes leading from each pair of teat cups to one of said milk receivers, the tubes of the same group of cups being connected to adjoining receivers.

14. A milking machine comprising a milk receptacle and cover therefor, a milk receiver having its open lower end tapped into said cover and provided on its inner walls with an inwardly projecting rib forming a valve seat, a valve disk within the open lower end of said receiver having freedom of movement therein and seated against said rib when said receiver is being filled, and said receiver having means below said valve forming a stop therefor when the suction is relieved in said receiver to drop said valve and discharge the milk.

In witness whereof, we have hereunto set our hands this 26th day of February 1916.

MARK J. MURPHY.
HARRY H. BRANDEAU.

Witnesses:
GENEVIEVE E. SORENSEN,
EDWARD A. PAUL.